Patented June 14, 1949

2,472,834

UNITED STATES PATENT OFFICE 2,472,834

CRACKING CATALYST

Robert E. Schexnailder, Jr., and Edward A. Hunter, Baton Rouge, La., assignors to Standard Oil Development Company, a corporation of Delaware No Drawing. Application October 18, 1947, Serial No. 780,768

5 Claims. (Cl. 252—455)

This invention pertains to the preparation of synthetic metal oxide gel catalysts and particularly to the preparation of synthetic silica-metal oxide cogels which are especially suitable for use in the catalytic conversion of hydrocarbon oils.

It is well known to prepare synthetic silica-alumina gels of high activity for the catalytic conversion of oils, particularly for the cracking of oils by combining alumina or a salt convertible into alumina with a hydrous oxide of silicon, such as silica hydrosol, silica hydrogel or gelatinous precipitates of silica and mixtures thereof, in which the silica contains a substantial amount of imbibed water at the time of mixing the alumina or the aluminum salt solution therewith.

It has recently been proposed to prepare synthetic metal oxide gel catalysts by preparing a silica-magnesia hydrogel, soaking said hydrogel with an aluminum or other catalytic metal salt solution under conditions to form the corresponding magnesium salt, leaving an equivalent amount of aluminum or other catalytic metal within the hydrogel as a hydrous oxide whereupon the magnesium salt is washed from the hydrogel and the latter dried and activated. This is a very effective method for preparing silica-metal oxide cogels containing up to as high as 65% of one or more catalytic metal oxides.

We have now found that it is also possible to prepare synthetic silica-metal oxide cogels by preparing a mixed hydrogel of silica and an alkaline earth metal oxide such as calcium, barium or strontium oxide, soaking said mixed hydrogel with an aluminum or other catalytic metal salt solution under conditions to form the corresponding alkaline earth metal salt leaving an equivalent amount of aluminum or other catalytic metal within the hydrogel as a hydrous oxide. When this reaction is completed, the mixed hydrogel is washed free of alkaline earth metal salt and then dried and activated at elevated temperatures. It was found that calcium oxide, for example, is more readily displaced from admixtures with silica hydrogel than is magnesia and that surprisingly in view of the limited solubility of calcium sulfate, calcium can be displaced from mixtures with silica hydrogel by reaction with aluminum sulfate.

The silica-alkaline earth metal oxide mixed hydrogel can be prepared by various processes. Silica hydrosol can, for example, be prepared by mixing an alkali metal silicate such as sodium silicate ($Na_2O.3.25SiO_2$) solution having a specific gravity of about 1.2 with an acid, such as sulfuric acid having a specific gravity of about 1.19. Alternatively, the silica hydrosol may be prepared by percolating a sodium silicate solution over a bed of an acid regenerated cation exchange material.

The silica hydrosol, prepared in any desired manner, can be impregnated with a salt of an alkaline earth metal whereupon sufficient sodium hydroxide is added to precipitate the alkaline earth metal, or the silica hydrosol may be permitted to set to the hydrogel with the alkaline earth metal salt contained therein in unaltered condition whereupon sodium hydroxide may be added to precipitate the alkaline earth metal as a hydrous oxide within the silica hydrogel structure.

Instead of impregnating the silica hydrosol with the alkaline earth metal salt, the silica hydrosol may be permitted to set to the hydrogel, whereupon the hydrogel may be impregnated with an alkaline earth metal salt which is then precipitated by the addition of sodium hydroxide. Instead of impregnating the silica hydrogel with an alkaline earth metal salt, the silica hydrogel may be mechanically mixed with the desired alkaline earth metal oxide as by mulling or by passing the mixture of hydrogel and alkaline earth metal oxide through a homogenizer or suitable colloid mill. We may, if desired, subject the hydrogel to a thorough washing treatment to remove sodium and sulfate ions substantially completely therefrom prior to impregnating the hydrogel with an alkaline earth metal salt or before incorporating the alkaline earth metal oxide in the hydrogel. The amount of alkaline earth metal oxide combined with the silica hydrogel is varied in accordance with the amount of active metal oxide which is desired in the final catalyst. Ordinarily sufficient alkaline earth metal oxide is incorporated so that from about 1% to as high as 65%, preferably about 5 to 20% of active metal oxide is incorporated when the alkaline metal oxide-containing hydrogel is treated with a solution of the salt of the desired metal.

The mixed hydrogel prepared in any suitable manner may then be treated with a solution of a salt of a metal the oxide of which exerts a substantially catalytic activity in the conversion of hydrocarbons. Such salts can be of any metals from groups II, III, IV, VI, VII and VIII of the periodic table such as aluminum, beryllium, chromium, cobalt, iron, manganese, nickel, thorium, titanium, vanadium, molybdenum, uranium, zinc, zirconium and the like.

Any salt of the above metals may be used which is characterized by the fact that the salt will react with the alkaline earth metal oxide to form the corresponding alkaline earth metal salt while the metal is precipitated in the hydrogel as the hydrous oxide. Suitable salts of the above-mentioned metals are, for example, the sulfates, the halides, preferably the chlorides and the nitrates. We may use two or more salts of a single acid or we may utilize salts of two or more metals and the same or different acids.

The soaking or impregnation of the mixed silica-alkaline earth metal oxide hydrogel can be effected with solutions of salts of said catalytic metals of such concentration that solutions form a moderately thick slurry with hydrogel particles. The impregnation of the mixed hydrogel is preferably conducted at or about room temperature although elevated temperatures and pressures may be employed if desired.

The following examples are illustrative of the present invention:

Example I 1000 volumes of sodium silicate solution ($Na_2O.3.25\ SiO_2$) having a specific gravity of 1.21 were added to 500 volumes of sulfuric acid having a specific gravity of 1.19. The resultant hydrosol was impregnated with a 30 wt. per cent aqueous slurry of calcium oxide. Addition of the calcium oxide slurry caused rapid setting of the hydrosol to a CaO-impregnated silica hydrogel.

This calcium oxide impregnated silica hydrogel or mixed hydrogel was granulated and soaked for about 70 hours in a solution containing 120% of the stoichiometric $Al_2(SO_4)_3$ required to react with the CaO in the hydrogel. The treated hydrogel was washed with distilled water by decantation at room temperature. About 40 vols. water per 1 vol. hydrogel were required. The washed hydrogel was dried and calcined at about 850° F. for 3 hours. A portion of the catalyst was heated at 1550° F. for 3 hours and another portion was steamed at 1050° F. for 24 hours at 60 p. s. i. g.

Catalysts treated in the above way were given a standard fixed bed cracking test on east Texas light gas oil of 33.8 A. P. I. gravity with a feed rate of 0.6 volume of feed per volume of catalyst per hour at 850° F. The results obtained are summarized below:

| Catalyst treatment | D+L%[1] |
|---|---|
| Heated 3 hours at 850° F | 55 |
| Heated 3 hours at 1550° F | 48.5 |
| Steamed 24 hours at 1050° F. and 60 p. s. i. g | 21.5 |

[1] D+L—percentage of liquid product obtained which distilled below 400° F.

These data show that this catalyst, which analyzed about 90% $SiO_2$, 8% $Al_2O_3$ and 0.5% CaO (perhaps present as calcium sulfate) shows good activity, high heat stability and fair steam stability.

Example II

A further sample of a silica-alumina catalyst was prepared as described in Example I. This sample contained about 20% by wt. of $Al_2O_3$. When tested as described above it showed the excellent steam stability (steamed 24 hours at 1050° F. at 60 p. s. i. g.) of 30% D+L.

Example III

The procedure of Example I was duplicated with the exception that aluminum chloride was used instead of aluminum sulfate. This catalyst also showed a steam stability of 30% D+L when tested as described above.

The foregoing description contains a limited number of embodiments of the present invention. It will be understood, however, that numerous variations are possible without departing from the scope of the following claims.

What we claim and desire to secure by Letters Patent is:

1. A method of preparing synthetic silica-metal oxide gels suitable for use in the catalytic conversion of hydrocarbon oils which comprises preparing a mixed hydrogel of silica and an alkaline earth metal oxide, soaking said mixed hydrogel with a solution of a salt of a metal, the oxide of which exerts a substantial catalytic effect upon the conversion of hydrocarbon oils, thereby forming the corresponding alkaline earth metal salt and precipitating an equivalent amount of said metal within the hydrogel as a hydrous oxide, washing, drying and calcining the hydrogel.

2. A method of preparing synthetic silica-metal oxide gels suitable for use in the catalytic conversion of hydrocarbon oils which comprises preparing a mixed hydrogel of silica and calcium oxide, soaking said mixed hydrogel with a solution of a salt of a metal, the oxide of which exerts a substantial catalytic effect upon the conversion of hydrocarbon oil, thereby forming the corresponding calcium salt and precipitating an equivalent amount of said metal within the hydrogel as a hydrous oxide, washing, drying and calcining the hydrogel.

3. A method of preparing synthetic silica-metal oxide gels suitable for use in the catalytic conversion of hydrocarbon oils which comprises preparing a silica hydrogel substantially free of sodium and sulfate ions, impregnating said hydrogel with an alkaline earth metal oxide, soaking the impregnated hydrogel with a solution of a salt of a metal, the oxide of which exerts a substantial catalytic effect upon the conversion of hydrocarbon oils, thereby forming the corresponding alkaline earth metal salt and precipitating an equivalent amount of said metal within the hydrogel as a hydrous oxide, washing, drying and calcining the hydrogel.

4. A method of preparing synthetic silica-metal oxide gels suitable for use in the catalytic conversion of hydrocarbon oils which comprises preparing a silica hydrogel substantially free of sodium and sulfate ions, impregnating said hydrogel with calcium oxide, soaking the calcium oxide-impregnated hydrogel with a solution of a salt of a metal, the oxide of which exerts a substantial catalytic effect upon the conversion of hydrocarbon oils, thereby forming the corresponding calcium salt and precipitating an equivalent amount of said metal within the hydrogel as a hydrous oxide, washing, drying and calcining the hydrogel.

5. The process as defined in claim 4 wherein the metal salt is aluminum salt.

ROBERT E. SCHEXNAILDER, JR.
EDWARD A. HUNTER.

REFERENCES CITED

The following references are of record in the file of this patent:

UNITED STATES PATENTS

| Number | Name | Date |
|---|---|---|
| 2,076,545 | Caldwell | Apr. 13, 1937 |
| 2,278,590 | Ruthruff | Apr. 7, 1942 |
| 2,283,172 | Bates | May 19, 1942 |
| 2,356,303 | Connolly | Aug. 22, 1944 |